(12) United States Patent
Murari et al.

(10) Patent No.: US 6,587,312 B2
(45) Date of Patent: Jul. 1, 2003

(54) STRUCTURE FOR ELECTRICALLY CONNECTING MICROELECTROMECHANICAL DEVICES, IN PARTICULAR MICROACTUATORS FOR HARD DISK DRIVERS

(75) Inventors: Bruno Murari, Monza (IT); Benedetto Vigna, Pietrapertosa (IT); Simone Sassolini, Sansepolcro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 275 days.

(21) Appl. No.: 09/792,384

(22) Filed: Feb. 22, 2001

(65) Prior Publication Data

US 2001/0040772 A1 Nov. 15, 2001

(30) Foreign Application Priority Data

Feb. 23, 2000 (EP) .............................. 00830128

(51) Int. Cl.⁷ ................................. G11B 5/55
(52) U.S. Cl. ................... 360/294.3; 310/309
(58) Field of Search ............................ 360/294, 294.6, 360/234.6, 264.4, 264.5; 369/44.16, 44.18, 44.32; 310/309, 40 MM

(56) References Cited

U.S. PATENT DOCUMENTS

| | | | |
|---|---|---|---|
| 5,506,175 A | 4/1996 | Zhang et al. | 437/228 |
| 5,914,553 A | 6/1999 | Adams et al. | 310/309 |
| 6,239,952 B1 * | 5/2001 | Bonin | 360/294.4 |
| 6,469,415 B2 * | 10/2002 | Jerman et al. | 310/309 |
| 6,486,665 B1 * | 11/2002 | Funk et al. | 310/309 |

FOREIGN PATENT DOCUMENTS

| | | |
|---|---|---|
| DE | 196 43 182 A1 | 4/1997 |
| EP | 0 975 086 A1 | 1/2000 |

* cited by examiner

*Primary Examiner*—A. J. Heinz
(74) *Attorney, Agent, or Firm*—Lisa K. Jorgenson; Robert Iannucci; Seed IP Law Group PLLC

(57) ABSTRACT

An electrical connection structure having connection elements which electrically connect a movable part to a fixed part of a microelectromechanical device, for example a microactuator. The movable part and fixed part are separated by trenches and are mechanically connected by spring elements, which determine, together with the connection elements, the torsional rigidity of the microelectromechanical device. Each connection element is formed by multiple sub-arms connected in parallel and having a common movable anchorage region anchored to the movable part, and a common fixed anchorage region anchored to the fixed part, whereby the mechanical resistance of the connection elements is negligible. The sub-arms have a width equal to a sub-multiple of the width necessary in case of a single connection element for the latter to have a preset electrical resistance, which is determined in the design. In particular, the width of the sub-arms is at least equal to the width of the single connection element divided by the number of sub-arms.

19 Claims, 3 Drawing Sheets

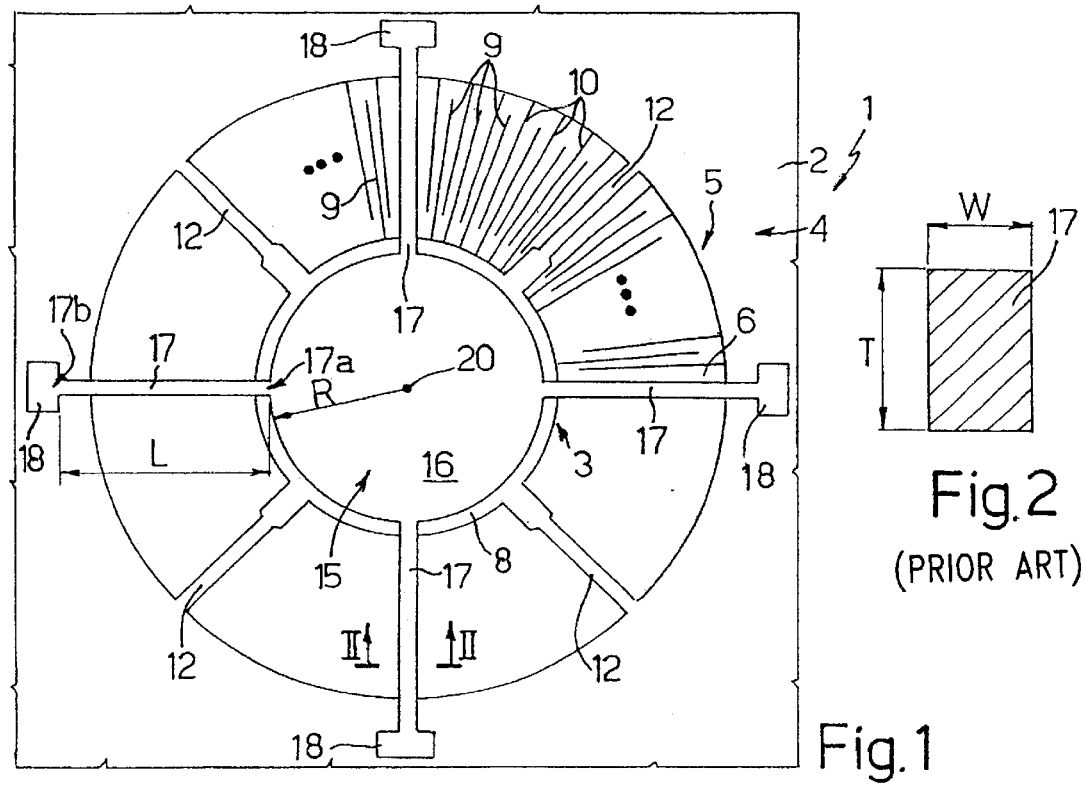
Fig.2 (PRIOR ART)
Fig.1 (PRIOR ART)
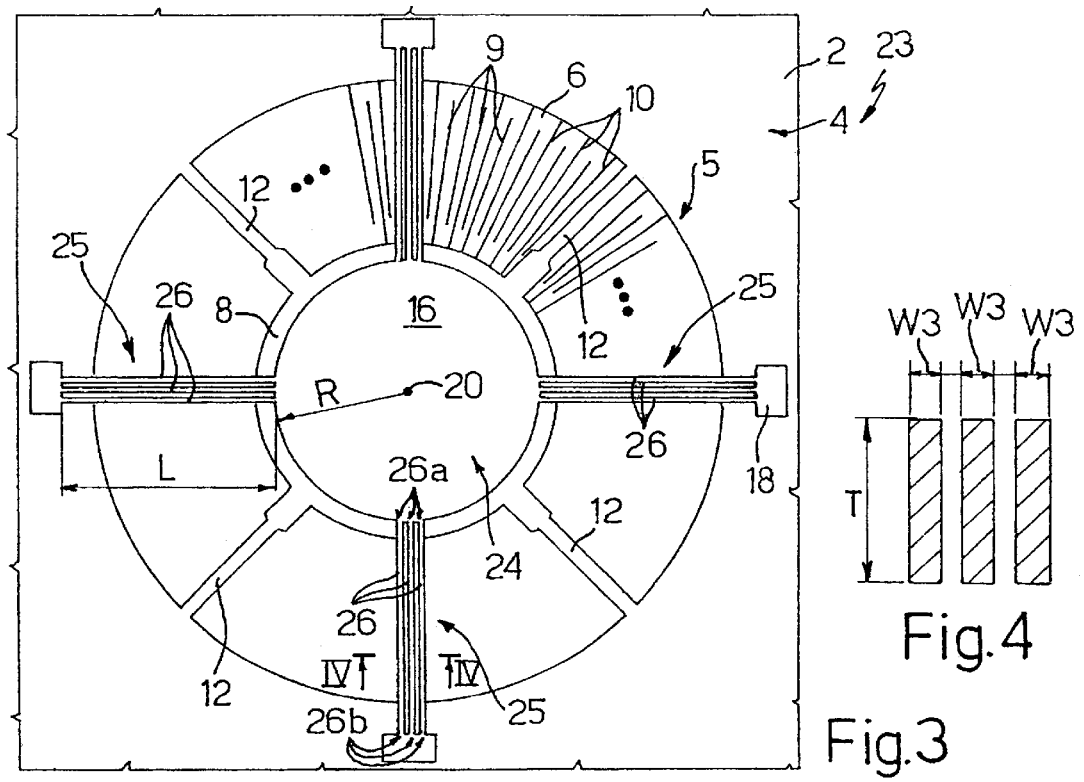
Fig.4
Fig.3

STRUCTURE FOR ELECTRICALLY CONNECTING MICROELECTROMECHANICAL DEVICES, IN PARTICULAR MICROACTUATORS FOR HARD DISK DRIVERS

TECHNICAL FIELD

The present invention regards a structure for electrically connecting microelectromechanical devices, in particular microactuators for hard disk drivers.

BACKGROUND OF THE INVENTION

As is known, with the advent of new microactuating devices for hard disk drivers, the problem has arisen to devise an effective method for carrying the signal from the head (which is moving) to a fixed point located, for example, on the suspension.

For this purpose, electrical connections of a conductive material, generally metal, are used so as to ensure a low mechanical as well as electrical resistance.

In particular, the connection must not modify the mechanical resistance of the system including the head and the microactuating device and, specifically, the torsional resistance of the movable part of the microactuating device with respect to the fixed part. In fact, the movable part of the microactuating device (rotor) is connected to the fixed part via suspension regions called "springs" and, in general terms, the overall mechanical resistance of the system is affected both by the resistance of the springs and by the resistance of the electrical connections. Since the processes for forming the springs and the electrical connections are generally very different, in the worst case the overall mechanical resistance of the system may be equal to the sum of the two resistances.

Ideally, the mechanical resistance of the connections should be negligible as compared to that of the springs, which are sized so as to bestow on the entire microelectromechanical system the desired torsional rigidity. With current solutions, this, however, is not possible.

SUMMARY OF THE INVENTION

An embodiment of the present invention includes a structure for electrically connecting movable and fixed parts of a microelectromechanical device that overcomes the above problem.

According to an embodiment the present invention, a microelectromechanical device is provided with an electrical connection structure that includes connection elements which electrically connect a movable part to a fixed part of a microelectromechanical device, for example a microactuator. The movable part and fixed part are separated by trenches and are mechanically connected by spring elements, which together with the connection elements determine the structural rigidity of the microelectromechanical device. Each connection element is formed by multiple sub-arms connected in parallel and having a common movable anchorage region anchored to the movable part, and a common fixed anchorage region anchored to the fixed part, such that the mechanical resistance of the connection elements is negligible. The sub-arms have a width equal to a sub-multiple of the width necessary for a single connection element to have a predetermined electrical resistance, as determined by the design; i.e., the width of the sub-arms is equal to the width of the single connection element divided by the number of sub-arms. In particular, the width of the sub-arms is at least equal to the width of the single connection element divided by the number of sub-arms.

BRIEF DESCRIPTION OF THE DRAWINGS

For a better understanding of the present invention, preferred embodiments thereof will now be described, simply as non-limiting examples, with reference to the attached drawings, wherein:

FIG. 1 is a top view of a microelectromechanical device provided with a known connection structure;

FIG. 2 is a cross-section taken along line II—II of FIG. 1;

FIG. 3 shows a top view of the microelectromechanical device of FIG. 1 provided with a connection structure according to the invention;

FIG. 4 is a cross-section taken along line IV—IV of FIG. 3;

DETAILED DESCRIPTION OF THE INVENTION

Figure 5:
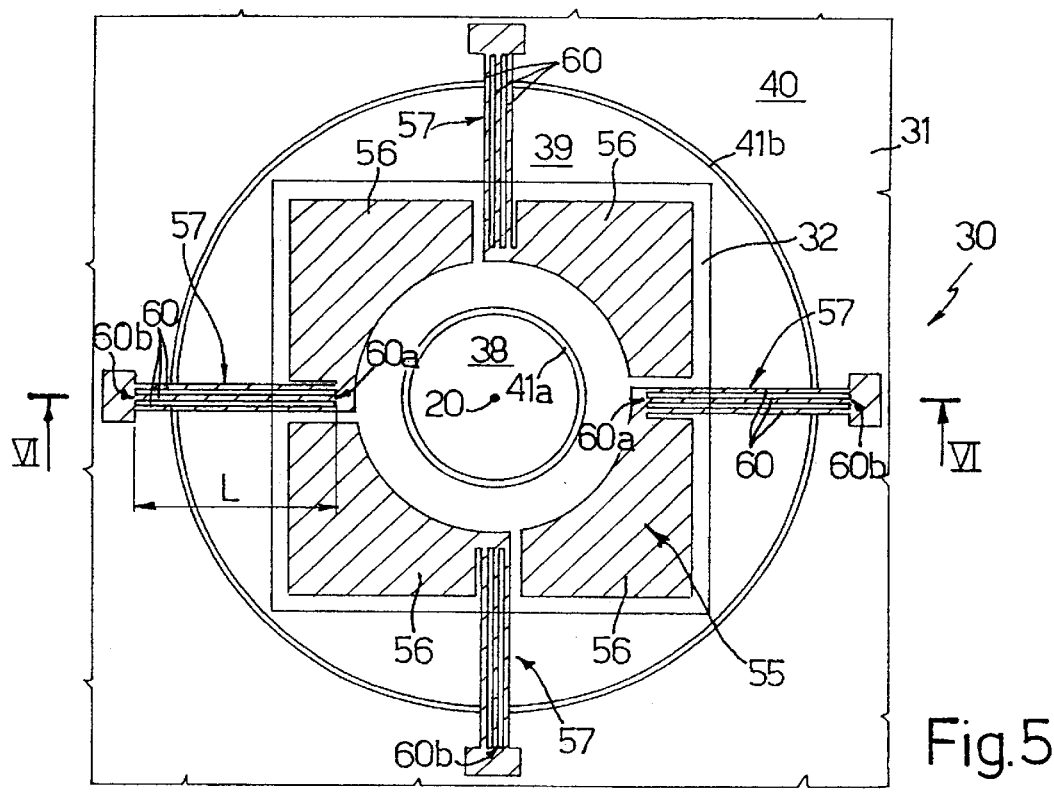
FIG. 5 shows a top view of a microactuator for a hard disk driver, provided with a connection structure according to the invention.

FIG. 1 is a simplified representation of a known generic microelectromechanical device, formed in a semiconductor material body 2. The microelectromechanical device 1 may form a microactuator, a microsensor for detecting motion or pressure, or some other structure provided with suspended parts, which are movable with respect to the fixed part. The microelectromechanical device thus comprises an inner, movable, part (forming a rotor 3) and an outer, fixed, part 4 (forming the stator 5), the two parts being separated by trenches 6.

In detail, the rotor 3 comprises a central region 8 having a circular shape and a plurality of movable electrodes 9 which extend radially from the central region 8 towards the fixed part 4, and are illustrated only partially, given the symmetry of the structure. The stator 5 comprises a plurality of fixed electrodes 10 extending radially inwards; in particular, each fixed electrode 10 extends between two adjacent movable electrodes 9.

The rotor 3 is suspended and is connected to the body 2 through anchorage and suspension elements, also referred to as "springs" 12, which extend radially from the central region 8 as far as the fixed part 4. Insulating regions (not shown) guarantee, in a known way, electrical insulation of the springs 12, and thus of the rotor 3, with respect to the fixed part. Likewise, further insulating regions (not shown) ensure electrical insulation of the fixed electrodes 10 from the rest of the fixed part 4 and from one another, so as to enable separate biasing of the two fixed electrodes set on either side of each movable electrode 9, in a per se known manner and thus not described in detail.

An electrical connection structure 15 for the rotor 3 extends above the rotor 3 itself and comprises a central plate 16, which is coaxial with and has a slightly smaller diameter than the central region 8, and a plurality of connection arms 17 (four, in the example illustrated) which extend from the central plate 16 as far as the fixed part 4. The connection arms 17 are preferably floating and have at the ends anchorage portions 18 connected to special biasing regions (not shown) formed in the fixed part 4 or to bonding wires (not shown either). Alternatively, the connection arms 17 may extend above the springs 12. The connection arms 17 are of conducting material, such as metal, obtained through photolithographic techniques that are extensively used in microelectronics.

Each connection arm 17 is connected internally to the central plate 16 in a movable anchorage point 17a at an inner end of the connection arm 17 and is set at a distance R form the rotation axis 20 of the rotor 3. In addition, each connection arm 17 is connected externally to the fixed part 4 in a fixed anchorage point 17b corresponding with an outer end of the connection arm 17. Between the movable anchorage point 17a and the fixed anchorage point 17b, each connection arm 17 has a length L. The cross-section of each connection arm 17 is shown in FIG. 2 and typically has a rectangular shape, of width W, thickness T, and area A=W×T.

In general, the torsional rigidity $K_\theta$ of a set of connection arms anchored externally to the movable part is given by the following equation:

$$K_\vartheta = EN\frac{W^3 T}{3L}\left[3\left(\frac{R}{L}\right)^2 + \frac{R}{L} + 1\right] \quad (1)$$

where E is Young's modulus; W is the width; T is the thickness; L is the length; N is the number of connection arms; and R is the distance between the movable anchorage point 17a and the center of rotation of the connection structure.

In the example shown in FIG. 1, then, the torsional rigidity $K_{\theta 1}$ of the connection structure 16 is $$K_{\vartheta 1} = 4E\frac{W^3 T}{3L}\left[3\left(\frac{R}{L}\right)^2 + \frac{R}{L} + 1\right].$$

In order to reduce the torsional rigidity $K_{\theta 1}$ of the connection arms 17, according to the invention each connection arm 17 is divided into a number of connection sub-arms, so as to have a same current passage area A (and thus a same total electrical resistance). In particular, each connection arm 17 is replaced by m sub-arms, each having a width W1=W/m. All the other parameters remain unchanged.

In this condition, the connection structure has N1=N×m sub-arms, each having a width W1=W/m, as indicated above. A connection structure of this sort has the following torsional rigidity $K_{\theta m}$:

$$K_{\vartheta m} = ENm\frac{W^3 T}{3Lm^3}\left[3\left(\frac{R}{L}\right)^2 + \frac{R}{L} + 1\right]$$

$$= EN\frac{W^3 T}{3Lm^2}\left[3\left(\frac{R}{L}\right)^2 + \frac{R}{L} + 1\right] = \frac{K_\vartheta}{m^2}.$$

An embodiment of a connection structure 24 according to the invention is shown in FIG. 3, wherein same parts as in FIG. 1 are designated by the same reference numbers.

In detail, in FIG. 3 a microelectromechanical device 23 comprises a connection structure 24, preferably of a metal, including four connection elements 25, each including three sub-arms 26 connected together in parallel. Each sub-arm 26 is connected internally to the central plate 16 in a movable anchorage point 26a at the inner end of the sub-arm 26 and is set at a distance R from the rotation axis 20 of the rotor 3. In addition, each sub-arm 26 is connected externally to the fixed part 4 in a fixed anchorage point 26b at the outer end of the sub-arm 26. The sub-arms 26 of each connection element 25 are connected together at the movable anchorage point 26a and at the fixed anchorage point 26b.

Between the movable anchorage point 26a and the fixed anchorage point 26b, each sub-arm 26 has a length L equal to that of the connection arms 17 of FIG. 1. The cross section of each sub-arm 26 is shown in FIG. 4 and has a width W2=W/3, a thickness T, and an area A1=W×T/3.

Consequently, the connection structure 24 has a torsional rigidity $K_{\theta 2}$ as follows:

$$K_{\vartheta 2} = 12E\frac{W^3 T}{3^4 L}\left[3\left(\frac{R}{L}\right)^2 + \frac{R}{L} + 1\right]$$

$$= 4E\frac{W^3 T}{3^3 L}\left[3\left(\frac{R}{L}\right)^2 + \frac{R}{L} + 1\right] = \frac{K_\vartheta}{9}$$

and thus equal to ⅑ of the torsional rigidity $K_\vartheta$ of the connection structure 17 of FIG. 1.

As indicated, each connection element 25 has an area A=W×T equal to that of each connection arm 17 of FIG. 1. Since the electrical resistance $R_e$ of each connection element 25 is given by:

$$R_e = \rho L/A$$

where ρ is the resistivity of the material, and L and A are, respectively, the length and the area of each connection element, as indicated above, each connection element has electrical resistance equal to that of a connection arm 17 of FIG. 1.

Figure 7:
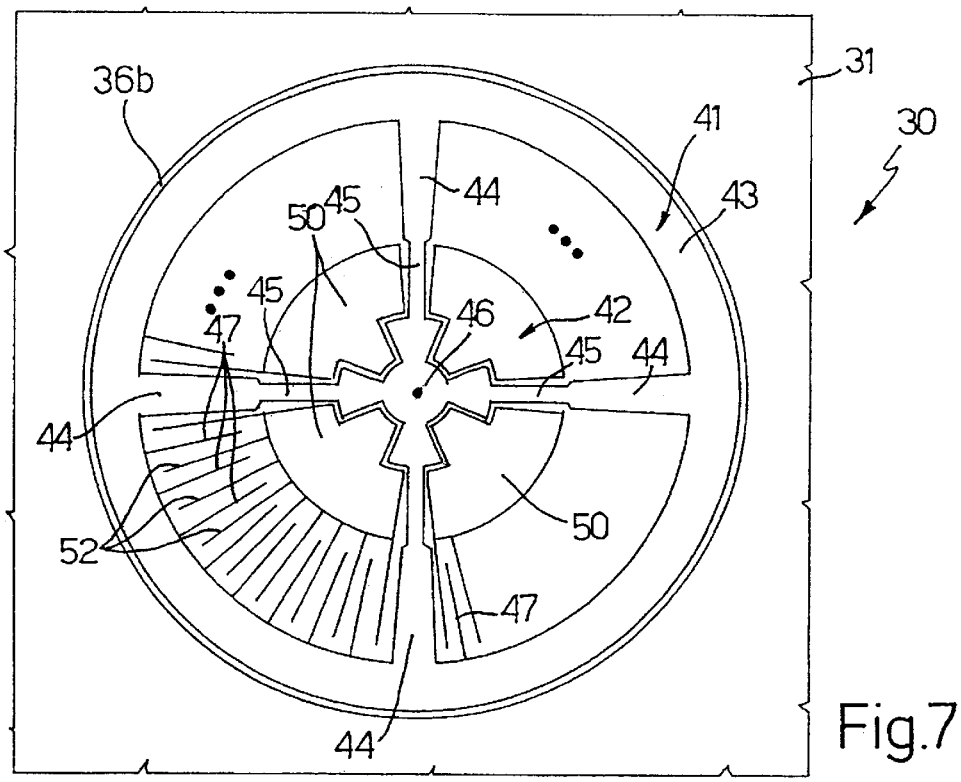
FIG. 7 shows a cross-section taken along line VII—VII of FIG. 6.
Figure 6:
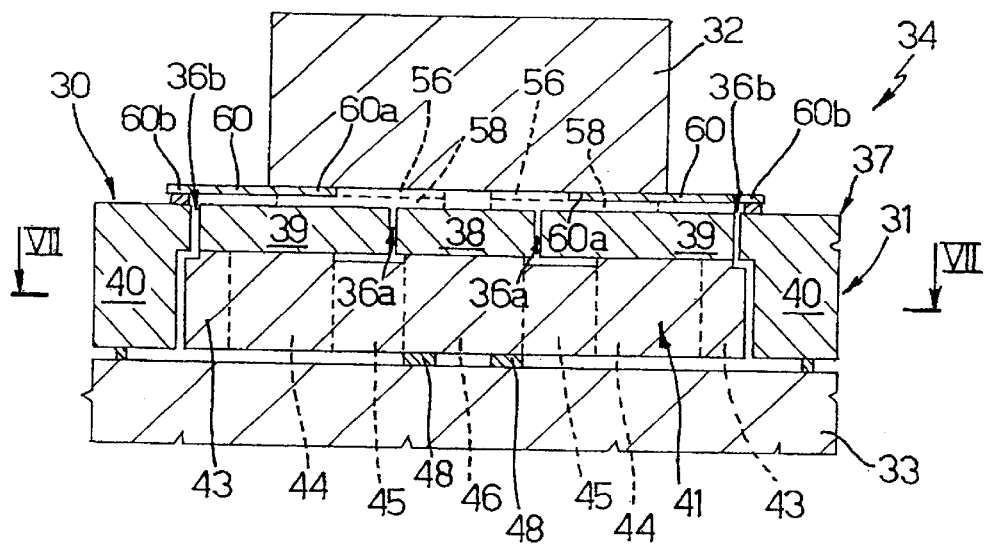
FIG. 6 shows a cross-section taken along line VI—VI of FIG. 5.

Another example of microelectromechanical device to which the invention can be applied is shown in FIGS. 5–7 and regards a microactuator 30 for micrometric adjusting the position of a read/write head (or "slider") with respect to a hard disk.

In detail, the microactuator 30 is formed in a semiconductor material body 31 having a face fixed to a slider 32 (shown in see-through view in FIG. 5), and on an opposite face fixed to a suspension 33 belonging to a hard disk driver 34 (FIG. 6).

The semiconductor material body 31 (FIG. 6) moreover forms a supporting structure 37 surrounding the microactuator 30 above and laterally, and comprising a central supporting region 38, which is fixed, an annular supporting region 39, which is movable, and an outer region 40, which is fixed, the regions 38, 39 and 40 being separated from one another by trenches 36a, 36b.

The microactuator 30 (FIGS. 6 and 7) comprises a rotor 41 and a stator 42. The rotor 41 includes a movable annular region 43, directly anchored to the annular supporting region 39 and anchored to the central supporting region 38 through suspension arms 44, elastic suspension elements, referred to as "springs", 45, and a central anchorage region 46. The springs 45 are suspended and are separated from the supporting structure 37 by an air gap, as is evident in FIG. 6. Movable electrodes 47 extend from the movable annular region 43 and are directed radially inwards.

The central anchorage region 46 is fixed and is anchored, through connection and welding regions 48, to the suspension 33, welded also to the outer region 40. In practice, then, the central anchorage region 46 is an integral part of the supporting structure 37.

The stator 42 comprises four anchorage and supporting sectors 50 and fixed electrodes 52. The anchorage and supporting sectors 50 are anchored to the central supporting region 38 (in a way not shown) through insulating regions (not shown, either) and extend between pairs of adjacent springs 45, while the fixed electrodes 52 extend radially outwards from the anchorage and supporting sectors 50 (FIG. 7).

As is evident from FIGS. 5 and 6, the slider 32 is fixed to the annular supporting region 39 of the supporting structure 37 through a connection structure 55 comprising four fixing regions 56 and four connection elements 57. In particular, the fixing regions 56 extend between the slider 32 and the annular supporting region 39 and are electrically insulated from the latter through insulating regions 58 which extend only underneath the fixing regions 56 and appear only in FIG. 6, even though they are set at a distance from the sectional plane of FIG. 6.

Each one of the connection elements 57 comprises three sub-arms 60. Each sub-arm 60 is floating and extends from a movable anchorage point 60a, where the sub-arm 60 is connected to the other sub-arms 60 of the same connection element 57, and to the respective fixing region 56, as far as a fixed anchorage point 60b on the outer region 40, which is common to all the sub-arms 60 of the same connection element 57 (FIG. 5).

In practice, the sub-arms 60 are connected in parallel.

Similarly to the embodiment of FIG. 3, therefore, the sub-arms 60 have a reduced torsional resistance and have electrical resistance which is equal to that of a connection structure of a known type, i.e., one comprising a single connection arm for each fixing region 56, having the same total area.

The present invention can moreover be applied to micromechanical structures of a linear type, such as linear microactuators and accelerometers, oscillators, and mechanical filters and gyroscopes. As an example, FIG. 8 presents a schematic illustration of a linear sensor 70 according to the present invention.

Figure 8:
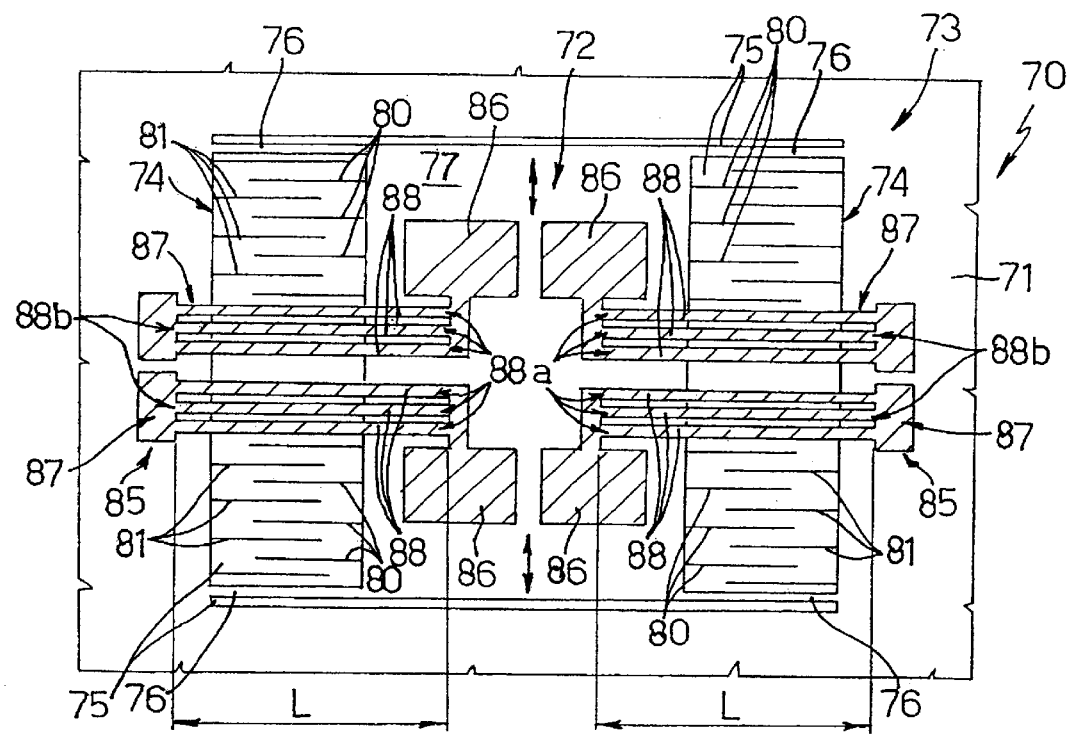
FIG. 8 shows a top view of a microactuator of a linear type, provided with a connection structure according to the invention.

In detail, the linear sensor 70 of FIG. 8 is formed in a semiconductor material body 71 and comprises a movable mass ("shuttle") 72 and a fixed part 73 (forming a stator 74), which are separated by trenches 75.

The movable mass 72 comprises a central region 77, which is suspended and also has a rectangular shape, connected to the fixed part 73 via four suspension arms or springs 76. Movable electrodes 80 extend from the two longer sides of the central region 77 and perpendicular thereto, and face fixed electrodes 81 which extend parallel to the movable electrodes 80 from the fixed part 73 towards the central region 77. The fixed electrodes 81 form the stator 74.

Insulating regions (not shown) ensure, in a known way, electrical insulation of the movable mass 72 from the fixed part. Likewise, further insulating regions (not shown) ensure electrical insulation of the fixed electrodes 81 from the rest of the fixed part 73 and from one another, so as to enable separate biasing of the two fixed electrodes set on either side of each movable electrode 80, in a per se known manner and thus not described in detail.

An electrical connection structure 85 extends above the movable mass 72 and comprises four metal regions 86 and four connection elements 87, each of which includes three sub-arms connected in parallel. Each sub-arm 88 is connected to the respective metal region 86 in a movable anchorage point 88a at a movable end of the sub-arm 88. In addition, each sub-arm 88 is connected externally to the fixed part 73 in a fixed anchorage point 88b at an outer end of the sub-arm 88. The sub-arms 88 of each connection element 87 are connected together at the movable anchorage point 88a and at the fixed anchorage point 88b.

As for the actuators shown in FIGS. 3, 4 and 5–7, the connection elements 87 are divided into a plurality of sub-arms 88 (three, in the example illustrated), the width of which W3 is a sub-multiple of the width W necessary for each connection element to have a given electrical resistance, which in turn is determined by the amount of current that is to pass in the connection element and by the operating conditions of the microactuator. In the illustrated example, W3=W/3. In this way, the electrical resistance of each connection element remains unvaried, whilst its torsional resistance decreases.

In particular, the rigidity K of an electrical connection structure for a microelectromechanical device of a linear type having N electrical connection elements of width W, thickness T and length L is given by the following equation:

$$K = EN\frac{W^3 T}{L} \qquad (2)$$

where E is Young's modulus.

In the case of the electrical connection elements 87 having a width W3=W/3, Eq. (2) becomes $$K_3 = 3EN\frac{W^3 T}{3^3 L} = K/9$$

and, in general, with m sub-arms of width W/m, the rigidity $K_m$ is $$K_m = K/m.$$

The advantages of the described connection structure are evident from the above description. In particular, it is emphasized that the connection structure according to the invention ensures a negligible mechanical resistance of the electrical connection elements with respect to the mechanical suspension elements (springs) resistance, for a same current carrying capacity. The connection structure can be formed using normal techniques employed in microelectronics, and in particular in the fabrication of microelectromechanical devices, with just a modification of the mask for defining the electrical connection elements, and thus without any increase in costs and without any modification of other parts of the microelectromechanical device.

Finally, it is clear that numerous variations and modifications may be made to the microelectromechanical device described and illustrated herein, all falling within the scope of the invention, as defined in the attached claims. In particular, although in the illustrated examples each connection element includes three sub-arms, the number of sub-arms present may vary according to the desired reduction in torsional resistance, the available spaces, and the minimum dimensions allowed by the definition techniques that are used for forming the sub-arms.

In addition, the described connection structure is equally applicable to microelectromechanical devices of a rotary type, in which the anchorage area for the movable part is external, and the anchorage area for the fixed part is internal. In this case, Eq. (1) must be modified in such a way that the sign "+" inside the square brackets becomes "−" (subtraction).

What is claimed is:

1. A microelectromechanical device comprising:
    a movable part and a fixed part separated by trenches and mechanically connected by spring elements; and an electrical connection structure including a connection element extending between said movable part and said fixed part, said connection element formed of electrically conductive material and including a plurality of sub-arms connected in parallel and having a common movable anchorage region anchored to said movable part and a common fixed anchorage region anchored to said fixed part.

2. The device according to claim 1, wherein said sub-arms are floating above one of the trenches.

3. The device according to claim 1, wherein said common movable and fixed anchorage regions are respectively connected to opposite ends of said sub-arms.

4. The device according to claim 1, wherein said electrical connection structure includes a plurality of connection elements, extending between said movable and fixed parts, each connection element comprising a plurality of sub-arms.

5. The device according to claim 4, wherein said electrical connection structure includes a single connection region connected to said plurality of connection elements.

6. The device according to claim 4, wherein said electrical connection structure includes a plurality of connection regions, each connection region being connected to a respective connection element.

7. The device according to claim 1, wherein the microelectromechanical device is of a rotary type.

8. The device according to claim 1, wherein the microelectromechanical device is of a linear type.

9. A hard disk driver comprising:
   a suspension;
   a microactuator fixed to said suspension, said microactuator comprising:
      a movable part and a fixed part being separated from each other by trenches and being mechanically connected to each other by spring elements, and
      an electrical connection structure including a connection element extending between said movable part and said fixed part and being formed of electrically conductive material, said connection element being formed with plural sub-arms connected in parallel and having a common movable anchorage region anchored to said movable part and a common fixed anchorage region anchored to said fixed part; and
   a read/write head connected to said microactuator.

10. The hard disk driver according to claim 9, wherein said electrical connection structure further comprises a plurality of connection elements extending between said movable part and said fixed part.

11. The hard disk driver according to claim 10, further comprising a plurality of said movable anchorage regions anchored to said movable part and a plurality of said common fixed anchorage regions anchored to said fixed part; and
wherein each said connection element is connected to a respective one of said movable anchorage regions and to a respective one of said fixed anchorage regions.

12. A microelectromechanical electrical interconnection structure comprising:
   a stator formed in a substrate;
   a rotor formed in said substrate and spaced apart from said stator;
   a plurality of suspension elements movably suspending said rotor relative to said stator;
   an electrical connection structure extending between and electrically coupling said rotor and said stator, said electrical connection structure including a connection arm having a plurality of electrically conductive sub-arms formed in parallel between a common movable anchorage point of said rotor and a stationary anchorage point of said stator and having a rectangular cross-section that minimizes structural resistance to relative planar motion between said rotor and said stator.

13. The structure according to claim 12, wherein said electrical connection structure further comprises a plurality of said connection arms, each said connection arm having a plurality of electrically conductive sub-arms formed in parallel between a respective common movable anchorage point of said rotor and a respective stationary anchorage point on said stator and each having a cross-section that minimizes structural resistance to relative planar motion between said rotor and said stator.

14. The structure according to claim 13, wherein said cross-section of said electrically conductive sub-arms further comprises a rectangular cross-section.

15. The structure according to claim 14, wherein said rectangular cross-section further comprises a rectangular cross-section having a thickness dimension measured perpendicular to a plane of motion between said rotor and said stator that is greater than a width dimension of said rectangular cross-section measured parallel to said plane.

16. The structure according to claim 15, wherein said width dimension is a function of the number of said plurality of sub-arms.

17. The structure according to claim 13, wherein:
   each of said rotor and said stator further comprises a substantially planar structure formed in said substrate; and
   one of said rotor and said stator is formed surrounding an other of said rotor and said stator in said substrate.

18. The structure according to claim 17, wherein said rotor and said stator are formed for relative rotational planar motion.

19. The structure according to claim 17, wherein said rotor and said stator are formed for relative transverse planar motion.

* * * * *